(12) United States Patent
Relyea

(10) Patent No.: US 7,930,709 B2
(45) Date of Patent: Apr. 19, 2011

(54) METHODS AND APPARATUS FOR A DYNAMIC LINKER SPEED UP

(75) Inventor: Robert Relyea, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1234 days.

(21) Appl. No.: 11/537,706

(22) Filed: Oct. 2, 2006

(65) Prior Publication Data

US 2008/0082992 A1   Apr. 3, 2008

(51) Int. Cl.
*G06F 15/163* (2006.01)
(52) U.S. Cl. .................................... 719/331; 717/162
(58) Field of Classification Search ............... 719/331, 719/332

See application file for complete search history.

(56) References Cited

U.S. PATENT DOCUMENTS

| 5,247,678 | A | * | 9/1993 | Littleton | 719/331 |
| 5,475,840 | A | * | 12/1995 | Nelson et al. | 719/331 |
| 6,029,207 | A | * | 2/2000 | Heninger | 719/331 |

OTHER PUBLICATIONS

Beazley, D.M., Ward, B.D., Cooke, I.R., "The inside story on shared libraries and dynamic loading," Computing in Science & Engineering, vol. 3, No. 5, pp. 90-97, Sep./Oct. 2001 [ retrieved from http://ieeexplore.ieee.org/stamp/stamp.jsp?tp=&arnumber=947112 &isnumber=20508 on Jun. 30, 2010].*

Grover, S., "Linkers and Loaders," Linux Journal (Nov. 26, 2002) [retrieved from http://www.linuxjournal.com/article/6463?page=0,0 on Jun. 29, 2010].*
The Santa Cruz Operation, Inc., "Dynamic Linker," (1999) [retrieved from http://docsrv.sco.com/SDK_cprog/_Dynamic_Linker.html on Jun. 28, 2010].*
Thomas, R., Reddy, B., "Dynamic Linking in Linux and Windows, Part One," Symantec, Inc. (Aug. 7, 2006) [retrieved from http://www.symantec.com/connect/articles/dynamic-linking-linux-and-windows-part-one on Jun. 29, 2010].*
Ray Lischner, "C++ in a Nutshell: A Language & Library Reference," O'Reilly & Associates, Inc., (2003), pp. 439-444.*
John R. Levine, "Linkers and Loaders," Morgan-Kaufmann (Oct. 25, 1999), pp. 247-272 (original manuscript version dated Jun. 15, 1999, published online on May 1, 2001) [retrieved from http://www.iecc.com/linker/ on Jun. 28, 2010].*
TIS Committe, "Tool Interface (TIS) Executable and Linking Format (ELF) Specification Version 1.2" (May 1995) [retrieved from http://refspecs.freestandards.org/elf/ on Dec. 7, 2010].*
Morgner, T., "Java Source Code: org.jfree.util.StringUtils" (2005) [retrieved from http://www.javadocexamples.com/java_source/org/jfree/util/StringUtils.java.html on Dec. 8, 2010].*

* cited by examiner

Primary Examiner — Hyung S Sough
Assistant Examiner — Brian Wathen
(74) Attorney, Agent, or Firm — MH2 Technology Law Group LLP

(57) ABSTRACT

An embodiment generally relates to a method of increasing efficiency in a dynamic linker. The method includes determining a length of a source string and a check segment of the source string and selecting a candidate string from a plurality of strings. The method also includes determining a candidate check segment of the candidate string based on the length of the source string and verifying the source string and the candidate string are identical in response to the check segment of the source string being identical to candidate check segment.

17 Claims, 5 Drawing Sheets

METHODS AND APPARATUS FOR A DYNAMIC LINKER SPEED UP

FIELD

This invention relates generally to a dynamic linker, more particularly, to methods and apparatus for a dynamic linker speed-up.

DESCRIPTION OF THE RELATED ART

When a computer program application linked with a shared library is executed, a dynamic linker will locate the appropriate shared library and arrange to somehow include it in the running image. Dynamic linking provides a variety of benefits. Dynamically linked shared libraries are easier to create and update than statically linked libraries. Dynamically linked shared libraries are easier to update than static linked shared libraries. The semantics of dynamically linked shared libraries can be much closer to those of unshared libraries. Finally, dynamic linking permits a program to load and unload routines at runtime, a facility that can otherwise be very difficult to provide.

As part of the linking process, the dynamic linker maintains a table of symbols that is exported to linked applications. Accordingly, the applications can dynamically update their links because their libraries are dynamically loaded and may shift. To find the correct entry for the respective application, the dynamic linker must walk through the entries in the table. These entries are null terminated and are referenced by a pointer.

One property of the entries in the table is that they may have long names. For example, one property of a C++ compiler is that it tends to generate long names. For a class, "My Class" with a method "Get Int" and function parameters, the table entry has a generated name that is typically a concatenation of the name of the class, an included method and function parameters. Another characteristic of the entries in the table is that they tend to include long swaths of the same characters. Continuing on with the previous example, the "My Class" may include several subclasses, each subclass having several functions. The generated names are typically the concatenation of the class name, a subclass, and function parameters, where several entries may start with the same class name and subclass. A conventional dynamic linker may have to process 30-40 bytes before detecting a different byte. Accordingly, as the table gets longer, and the link that is compared get longer, it takes longer for the dynamic linker to load up the module.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION Or EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of computing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to methods and apparatus to improve the speed of a dynamic linker. As part of dynamic linking, a dynamic linker may try to match a source string with another string in a string table. Conventional systems compare the entire source string with the entire candidate string of the string table, which involve a byte-by-byte comparison between the strings. Accordingly, the total time for the string comparisons may be great. On the other hand, embodiments implement a novel string compare, which requires less amount of time because of the reduction of string comparisons in the dynamic linker. More particularly, a comparison module may be configured to determine a length of the source string and a last segment from the end of the source string. The size of the last segment may be a byte or a machine-sized word. For example, on a 32-bit platform, the string "MyLongTestString" may return 'ing\0' as a four-byte word. Similarly, a 64-bit platform may return 'Tstring\0' as an eight-byte word.

The comparison module may retrieve the last segment of a potential candidate string in the table based on the length of the source string. The comparison module may then compare the last segments of the source string and the candidate string. If the last segments or check segments are different and the comparison module moves to the next candidate string. If the check segments are equivalent, the comparison module may then perform a byte-by-byte comparison of the source string and candidate string to verify identicalness. If these two strings are different, the strings do not match and the next candidate string is then tested. However, if the strings are identical, the comparison module may then be configured to return the candidate string. Accordingly, the speed of the dynamic linker is increased by reducing the number of entries that have to undergo a byte-by-byte comparison.

Figure 1A:
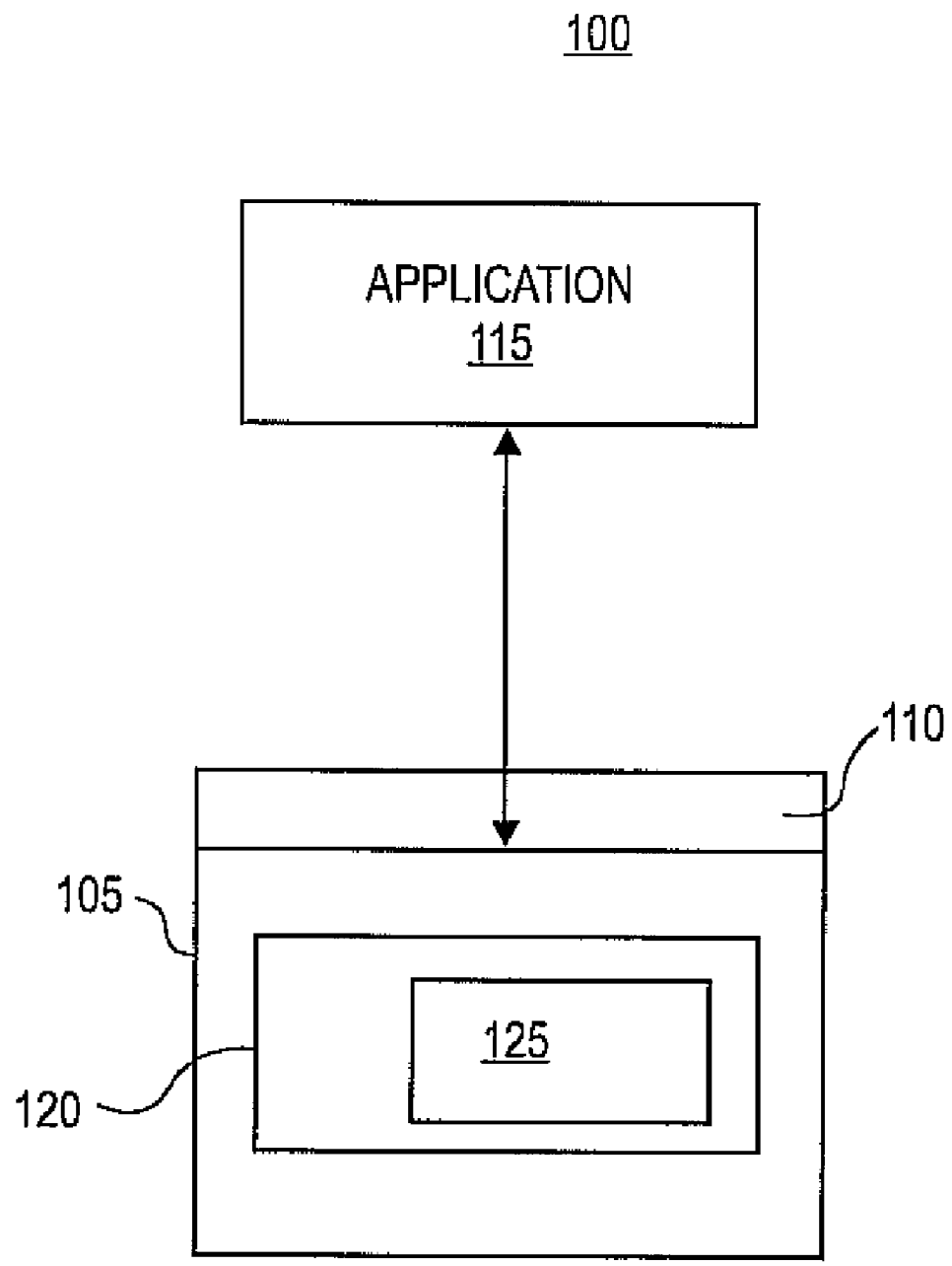
FIG. 1A illustrates an exemplary software environment in accordance with an embodiment.

FIG. 1A illustrates an exemplary software environment 100 in accordance with an embodiment. It should be readily apparent to those of ordinary skill in the art that the software environment 100 depicted in FIG. 1A represents a generalized schematic illustration and that other components may be added or existing components may be removed or modified.

As shown in FIG. 1A, the software environment 100 may include an operating system 105. The operating system 105 may be a version of a LINUX®, UNIX®, Windows®, or similar multi-tasking operating system. A runtime environment 110 may be configured to execute on the operating system 105. The runtime environment 110 may provide a set of software that supports the execution of applications/programs. The runtime environment 110 may include an application program interface ("API", not shown) and a complementary API (not shown) within an application 115. The API may be configured to provide a set of routines that the application 115 uses to request and carry out lower-level services performed by the operating system 105. The operating system 105 may include a kernel 120. The kernel 120 may be configured to provide secure access to the underlying hardware of a processor.

In some embodiments, the kernel 120 may execute a dynamic linker 125. The dynamic linker 125 can be configured to determine and load dependencies of the application 115. The dynamic linker 125 may also, if needed, relocate application 115 and its dependencies. The dynamic linker 125 may be further configured to initialize the application 115 and dependencies in the correct order.

Figure 1B:
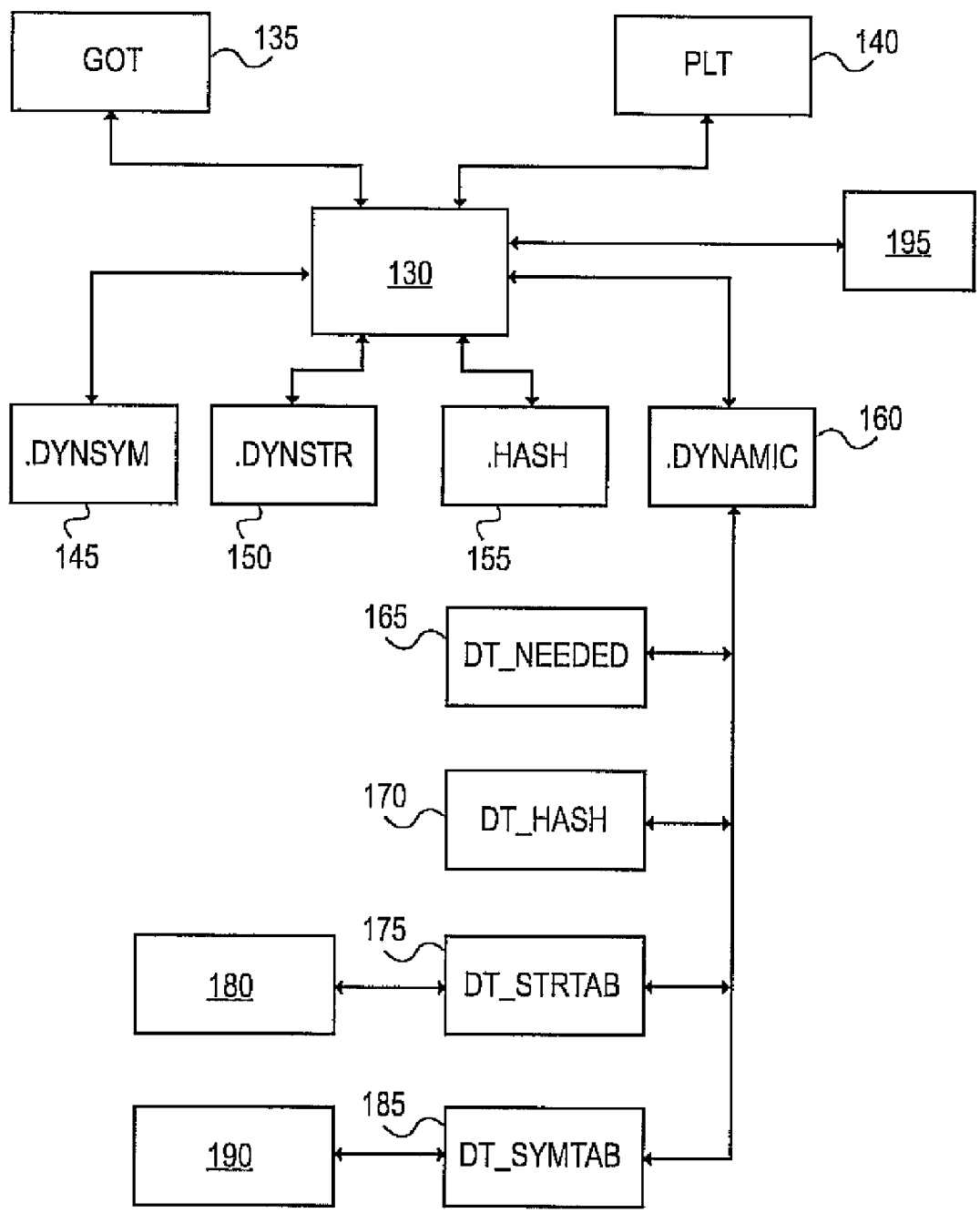
FIG. 1B illustrates an exemplary data structure in accordance with another embodiment.

FIG. 1B illustrates an exemplary dynamic linker 125 in accordance with an embodiment. It should be readily apparent to those of ordinary skill in the art that the dynamic linker 125 depicted in FIG. 1 represents a generalized schematic illustration and that other components may be added or existing components may be removed or modified. Moreover, the dynamic linker 100 may be implemented using software components, hardware components, or combinations thereof. For the software components may be implemented using a variety of computer languages such as C, C++, JAVA, etc.

As shown in FIG. 1B, the dynamic linker 125 may include a dynamic linker module 130. In some embodiments, the dynamic linker module 130 may support executable and linking format ("ELF"). Accordingly, the dynamic linker module 130 may be configured to use at least two processor specific tables, the Global Offset Table (labeled as GOT) 135 and the Procedure Linkage Table (labeled as PLT) 140. The dynamic linker module 130 may support position independent code ("PIC") through the GOT 135 in each library. The GOT 135 may be configured to store the absolute addresses of all of the static data referenced in the program. The address of the GOT 135 may be stored in a register (EBX) which is a relative address from the code that references it.

With reference to the PLT 140, the executables that use the shared libraries and the shared library itself has a PLT. Similar, to how the GOT 135 redirects any position-independent address calculations to absolute locations, the PLT 140 redirects position-independent function calls to absolute locations.

The dynamic linker module 130 may also be configured to interface with .DYNSYM 145, which contains all of the file's imported and exported symbols. The dynamic linker module 130 may be further configured to interface with .DYNSTR 150, which contains name strings for the symbols, .HASH 155 which a runtime linker can use to lookup symbols quickly, and .DYNAMIC 160, which is a list of tagged values and pointers.

The .DYNAMIC 160 may be configured to contain the following tag types. A DT_NEEDED 165, which holds the string table offset of a null-terminated string, giving the name of a needed library. The offset is an index into the tabled recorded in the DT_STRTAB entry. A DT_HASH 170 may be configured to hold the address of the symbol hash table which refers to the symbol table referenced by the DT_SYMTAB element. A DT_STRTAB 175 may be configured to hold the address of a string table 180. The string table 180 stores a plurality of string entries, each null terminated. A DT_SYMTAB 185 may be configured to store the address of the symbol table 190.

At program startup, the dynamic linker module 130 may be invoked to relocate and resolve references to its own routines which are needed to load everything else. As part of the resolution, the dynamic linker module 130 may have a source string to compare with the entries in the string table. In conventional systems, the dynamic linker module 130 may be configured to perform a byte-by-byte comparison for each string in the string table 180. This conventional method may take a considerable amount of time to identify the correct string in the string table.

Accordingly, the dynamic linker module 130 may use the comparison module 195 to speed up the comparison. More particularly, the comparison module 195 may be configured to determine a length of source string and the last machine-sized word of the source string. The comparison module 195 may also be configured to determine the length of a candidate string from the string table. If the lengths are different, the two strings are different and the comparison module 195 moves to the next candidate string. If the lengths are the same, the comparison module 195 may then compare the last word at the end of the source string with a last word at the end of the candidate string. If these two words are different, the strings do not match and the next candidate string is then tested. However, if the two last words are the same, the comparison module may then be configured to compare the source string and the candidate string on a byte-by-byte comparison to verify that the strings are identical. Accordingly, the speed of the dynamic linker is increased by reducing the number of entries that have to undergo a byte-by-byte comparison.

Figure 2A:
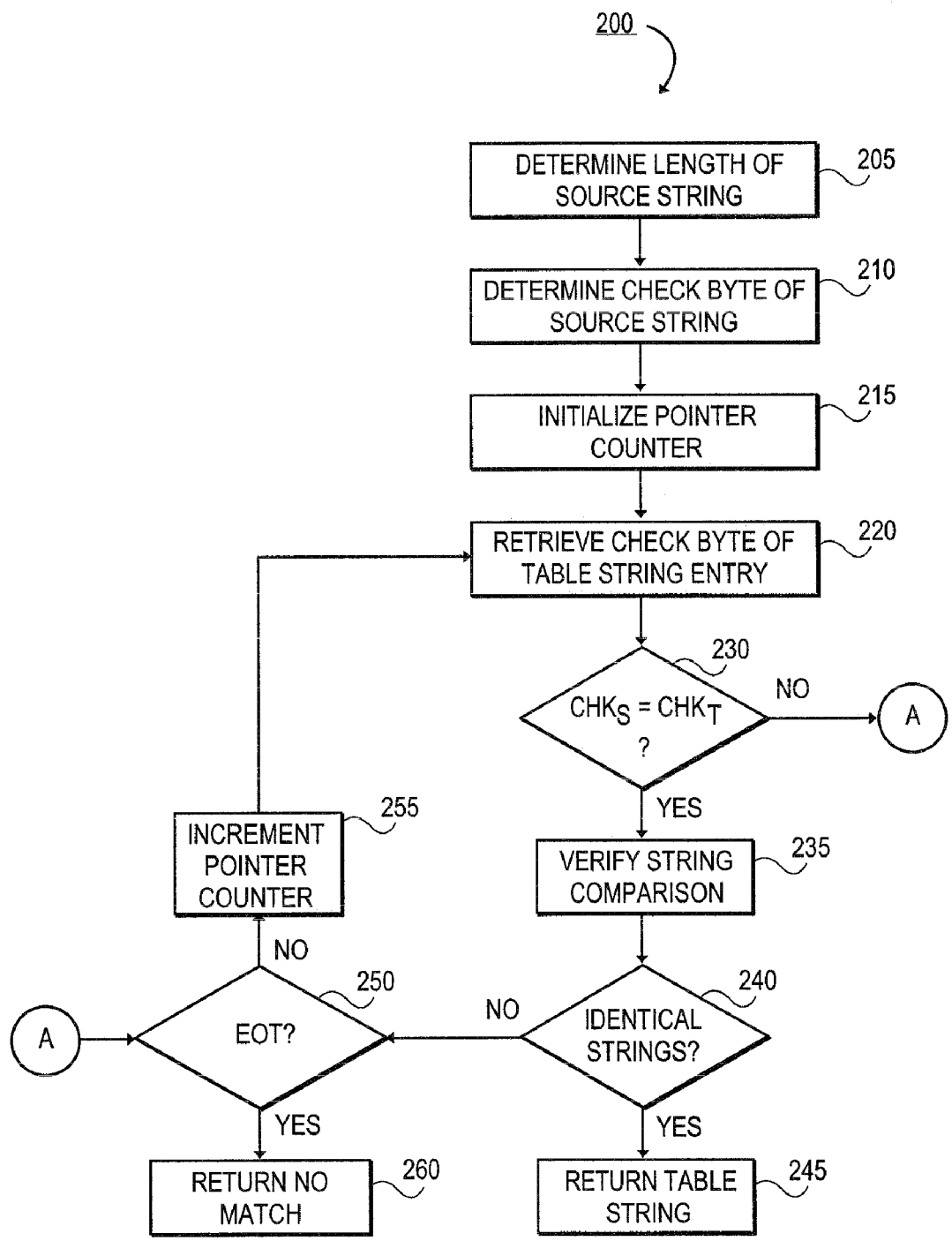
FIG. 2A illustrates an exemplary flow diagram in accordance with yet another embodiment.

FIG. 2A illustrates a flow diagram 200 implemented by the comparison module 190 in accordance with another embodiment. It should be readily apparent to those of ordinary skill in the art that the flow diagram 200 depicted in FIG. 2A represents a generalized illustration and that other steps may be added or existing steps may be removed or modified.

As shown in FIG. 2, the comparison module 190 may be configured to determine the length of a source string, in step 205. For example, the comparison module 195 may execute a "len" command to determine the length of the source string (e.g., len=strlen(source string)). The length of the source string may be stored temporarily in a register or a buffer.

In step 210, the comparison module 195 may determine a checkbyte for the source string. The source string checkbyte may be the last eight bits of the source string. In some embodiments, the source string checkbyte may be determined as Get_Check_Byte (source string, len), where the Get_Check_Byte function may be defined as Get_Check_Byte((string, len), string).

In step 215 the comparison module 195 may initialize a pointer counter. The pointer counter may be configured to allow the comparison module 195 to determine which candidate string in the string table 180 to retrieve. The pointer counter may initially be set to zero, which may point to the first string entry in the string table 180. Incrementing the pointer counter permits the comparison module 195 to retrieve the next entry (or candidate) in the string table 180.

In step 220, the comparison module 195 may be configured to retrieve the candidate string in the string table indexed by the pointer counter and determine the candidate string checkbyte. In some embodiments, the comparison module 195 may execute the Get_Check_Byte function with the candidate string and source string len as input variables.

In step 230, comparison module 195 may determine whether source checkbyte and the table string checkbyte are identical. If the checkbytes are identical, the comparison module 195 may execute a string comparison in step 235 to verify the retrieved string from the table 180 is identical. In some embodiments, the comparison module 195 may use a string compare function as known to those skilled in the art.

If the strings are verified as identical in step 240, the comparison module 195 may return the candidate string to the user, in step 245. Otherwise, if the strings are not identical, in step 240, the comparison module 195 may be configured to determine whether the end of the string table 180 has been reached in step 250. If the end of the string table 180 has not been reached, the comparison module 195 may increment pointer counter in step 255 and proceed to the processing of step 220. Otherwise, if the end of the table 180 has been reached, the comparison module 195 may return a no match, in step 260.

Returning to step 230, if the two checkbytes are not identical, the comparison module 195 may proceed to the processing associating with step 250.

In the embodiment described with respect to FIG. 2A, the comparison module 195 utilizes 8-bit bytes to determine identical strings. However, during the comparison of the checkbytes of the source string and candidate table string, there are three conditions that may result from the comparison. A first condition may be that the end of the candidate table string may match the end byte of the source string. A second condition may be that the end of the source string matches with a middle byte of the candidate table string because the candidate table string is longer than the source string. For this second condition, the checkbytes will not match. Finally, the third condition may be that the candidate tables string is smaller than the source string. In this condition, the check bytes will likely not match because of the retrieval of the checkbytes from zeroed out memory or the terminating byte of a different string. Nevertheless false positives may still occur, which is the reason for the verification of the identicalness of the strings in step 235.

Figure 2B:
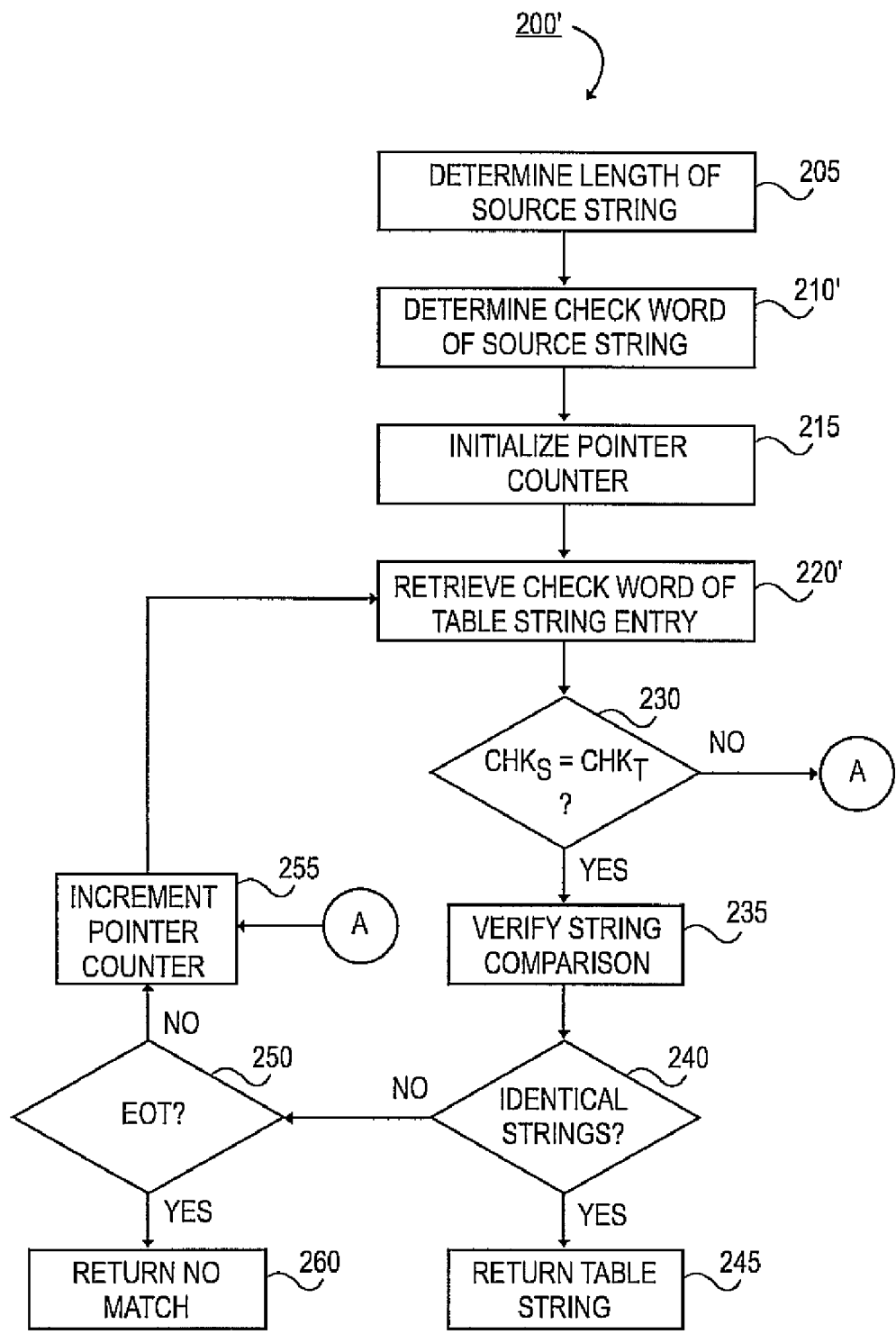
FIG. 2B illustrates another exemplary flow diagram in accordance with yet another embodiment.

In accordance with other embodiments, flow diagram 200' depicted in FIG. 2B may be implemented to reduce the number of false positives when using last bytes of a source string and candidate string. More particularly, the embodiments shown in FIG. 2B replaces the Get_Check_Byte function with a Get_Check_Word function. In some of these embodiments, the Get_Check_Word function may be defined as Get_Check_Word(string, len) (*long*)&string[len-sizeof (long)+1).

The Get_Check Word function retrieves the last word of the source string and candidate table string. As such, the Get_Check_Word function may be configured to retrieve a non-zero word with a null terminating byte. Accordingly, the check words of a source string and a candidate string will only match (1) when the strings are the same length and the last n bytes of the string match (e.g., n is sizeof(long)−1); and (2) when the candidate string is smaller than the source string and the memory beyond the candidate string happens to match the last n-bytes plus a null.

FIG. 2B illustrates an exemplary flow diagram 200' in accordance with yet another embodiment. Flow diagram 200' is related to flow diagram 200 depicted in FIG. 2A. Accordingly, the difference with respect to flow diagram 200' will be discussed and the description of the common steps with respect to flow diagram 200 are being relied on to provide adequate description of the common elements.

As shown in FIG. 2B, in step 210', the comparison module 195 may be configured to determine the last byte of the source string. The last word may be dependent on the processor, for example, 16 bit, 32 bit or 64 bit processors all have different sized words. A 32-bit processor, for example, would use a 4-byte word. The last word of the source string may also be stored in a second register, buffer or cache.

In step 220', the comparison module 195 may be configured to retrieve the last word of the candidate string from the string table 180 by executing the Get_Check_Word function as previously described above. In step 230, the comparison module 195 may be configured to determine whether the last checkwords of the source string and candidate string are identical.

For the certain embodiments, there are certain implementation issues. For example, endianness generally refers to sequencing methods used in writing to computer memory or the representation of data. For the embodiments associated with FIG. 2B, endianness of the underlying platform does not matter since the check is for equality and the underlying platform will produce the same format for the source string and candidate string checkwords.

Embodiments may also be affected by alignment. Some computing platforms cannot perform unaligned memory accesses. For example, if the address of string+len mod4!=0, then the platform may either produce incorrect results or generate an exception. On these platforms, the Get_Check_Word function can be modified to account for alignment.

Embodiments may be further affected by accessing beyond the end of memory. Since the target string can be shorter than the source string, it is possible the retrievals of the last byte or word may go beyond valid memory. Accordingly, the memory has to be validated prior to retrieval. One method, knowing that the strings are stored in a buffer of a fixed size, can check whether the retrieval goes beyond the fixed buffer size. For these retrievals, the candidate string is too short and the next string can be retrieved. Other platforms may provide inherent tools to verify that a particular memory address is valid.

Figure 3:
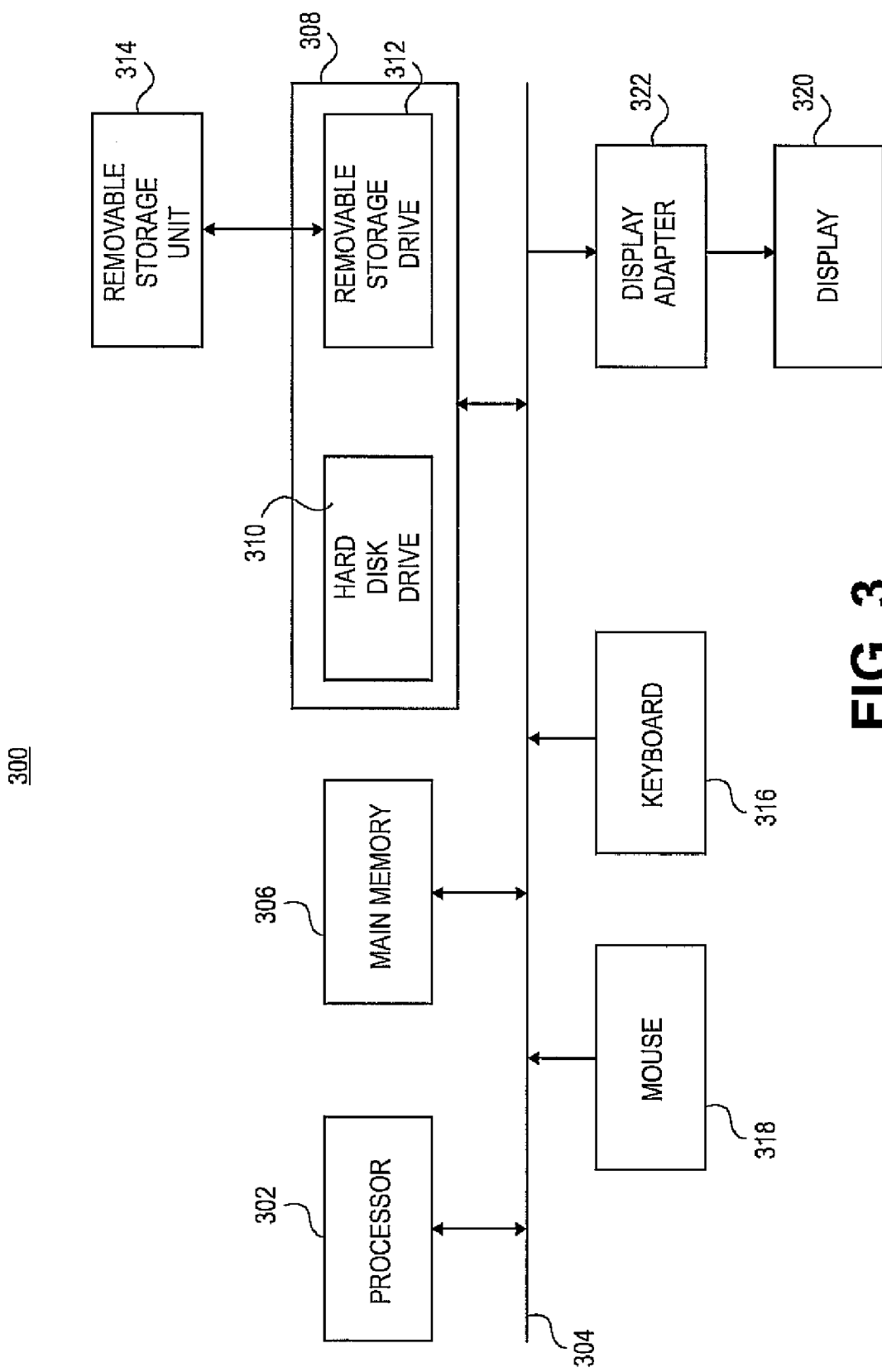
FIG. 3 illustrates an exemplary computing platform for the embodiments shown in FIGS. 1-2.

FIG. 3 illustrates an exemplary block diagram of a computing platform 300 where an embodiment may be practiced. The functions of the dynamic linker system and comparison module may be implemented in program code and executed by the computing platform 300. The dynamic linker system and comparison module may be implemented in computer languages such as PASCAL, C, C++, JAVA, etc.

As shown in FIG. 3, the computer system 300 includes one or more processors, such as processor 302 that provide an execution platform for embodiments of the dynamic linker system and comparison module. Commands and data from the processor 302 are communicated over a communication bus 304. The computer system 300 also includes a main memory 306, such as a Random Access Memory (RAM), where the dynamic linker system and comparison module may be executed during runtime, and a secondary memory 308. The secondary memory 308 includes, for example, a hard disk drive 310 and/or a removable storage drive 312, representing a floppy diskette drive, a magnetic tape drive, a compact disk drive, etc., where a copy of a computer program embodiment for the dynamic linker system and comparison module may be stored. The removable storage drive 312 reads from and/or writes to a removable storage unit 314 in a well-known manner. A user interfaces with the dynamic linker system and comparison module with a keyboard 316, a mouse 318, and a display 320. A display adapter 322 interfaces with the communication bus 304 and the display 320. The display adapter also receives display data from the processor 302 and converts the display data into display commands for the display 320.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of increasing efficiency in a dynamic linker on a computing system having a processor, the method comprising:
    determining a length of a first string;
    determining a first check segment of the first string;
    selecting a second string from a plurality of strings;
    determining a second check segment of the second string based on the length of the first string;
    determining that the first check segment matches the second check segment;
    determining that the first string matches the second string in response to the first check segment matching the second check segment; and
    linking, using the processor, a table reference by the second string to an application in response to the first string matching the second string.

2. The method of claim 1, further comprising indicating that the first string matches the second string in response to a byte-by-byte comparison matching each byte of each respective byte of the first string and the second string.

3. The method of claim 1, wherein the first check segment or the second check segment is one of a byte or a word.

4. The method of claim 3. further comprising selecting a next string from the plurality of strings in response to the first check segment not matching the second check segment.

5. A non-transitory computer-readable medium comprising computer-executable instructions for performing the method of claim 1.

6. A method of reducing comparisons on a computing system having a processor, the method comprising:
    detecting a first string;
    determining a first end segment of the first string;
    detecting a second string from a plurality of strings;
    determining a second end segment of the second string;
    determining that the first end segment is equivalent to the second end segment;
    comparing the first string and the second string on a byte-by-byte comparison in response to the first end segment being equivalent to the second end segment; and
    linking, using the processor, a table reference by the second string to an application in response to the comparison.

7. The method of claim 6, wherein the first end segment or the second end segment is one of a byte or a machine sized word.

8. The method of claim 7, further comprising determining a length of the first string.

9. The method of claim 8, wherein the first end segment is determined based on the length of the first string.

10. The method of claim 8, wherein the second end segment is determined based on the length of the first string.

11. The method of claim 7, wherein the first end segment and the second end segment have a width of a machine-sized word that comprises a null terminated character.

12. An apparatus comprising:
    a processor;
    a memory; and
    a comparison module stored on the memory, the comparison module being configured to execute computer readable instructions using the processor to:
        determine a length of a first string, determine a first end segment of the first string, select a second string from a plurality of strings, determine a second end segment of the second string based on the length of the first string, determine that the first end segment matches the second end segment, determine that the first string matches the second string in response to the first end segment matching the second end segment, and link a table reference by the second string to an application in response to the first string matching the second string.

13. The apparatus of claim 12, wherein the comparison module is further configured to indicate that the first string matches the second string in response to a byte-by-byte comparison matching each byte of each respective byte of the first string and the second string.

14. The apparatus of claim 13, wherein the comparison module is further configured to select a next string from the plurality of strings in response to the first end segment not matching the second end segment.

15. The apparatus of claim 12, wherein a last word of each string of the plurality of strings comprises a null terminated character.

16. The apparatus of claim 12, wherein the first end segment or the second end segment is one of a byte or a machine-sized word.

17. The apparatus of claim 16, wherein a last word of the first string comprises a null terminated character.

* * * * *